US012417682B2

(12) United States Patent
Abdel-Mottaleb et al.

(10) Patent No.: US 12,417,682 B2
(45) Date of Patent: Sep. 16, 2025

(54) SYSTEM AND METHOD FOR PROVIDING SECURITY ANALYTICS FROM SURVEILLANCE SYSTEMS USING ARTIFICIAL INTELLIGENCE

(71) Applicant: Voyance Technologies Inc., Coral Gables, FL (US)

(72) Inventors: Mostafa Abdel-Mottaleb, Coral Gables, FL (US); Rashed Kashem, Miramar, FL (US); Mohammed Zain Usman, Miami, FL (US); Kevin Robbins, Miami, FL (US)

(73) Assignee: Voyance Technologies Inc., Coral Gables, FL (US)

( * ) Notice: Subject to any disclaimer, the term of this patent is extended or adjusted under 35 U.S.C. 154(b) by 466 days.

(21) Appl. No.: 17/834,835

(22) Filed: Jun. 7, 2022

(65) Prior Publication Data

US 2023/0394938 A1 Dec. 7, 2023

(51) Int. Cl.
*G08B 13/196* (2006.01)
*G06V 10/70* (2022.01)
*G06V 20/40* (2022.01)
*G06V 20/52* (2022.01)
*G06V 10/82* (2022.01)

(52) U.S. Cl.
CPC ....... *G08B 13/19602* (2013.01); *G06V 10/70* (2022.01); *G06V 20/44* (2022.01); *G06V 20/52* (2022.01); *G06V 10/82* (2022.01)

(58) Field of Classification Search
None
See application file for complete search history.

(56) References Cited

U.S. PATENT DOCUMENTS

| 11,048,973 | B1* | 6/2021 | Ramanathan | ........ G06V 10/774 |
| 2019/0063140 | A1* | 2/2019 | Trundle | ............. G07C 9/00571 |
| 2019/0289263 | A1* | 9/2019 | Amini | ..................... G06V 20/52 |

* cited by examiner

*Primary Examiner* — Lennin R Rodriguezgonzalez
(74) *Attorney, Agent, or Firm* — Greenberg Traurig, P.A.; Mammen ("Roy") P. Zachariah

(57) ABSTRACT

A system for providing security analytics from surveillance systems using artificial intelligence is provided. In particular, the system monitors an environment of interest utilizing surveillance systems that include sensors for detecting and analyzing events, anomalies, actions, activities, objects, and/or anything of interest. As the system monitors the environment, first content including sensor data from the sensors is loaded into an artificial intelligence model for analysis. The artificial intelligence model compares the first content to second content that is utilized to train or is otherwise associated with the model. If the first content matches and/or correlates with the second content, the system generates a prediction relating to the detection of an object, activity, motion, action, occurrence, and/or anomaly. The system generates a confidence score for the prediction and if the confidence score is at a threshold value, the system may facilitate output of a response in response to the detection.

20 Claims, 10 Drawing Sheets

SYSTEM AND METHOD FOR PROVIDING SECURITY ANALYTICS FROM SURVEILLANCE SYSTEMS USING ARTIFICIAL INTELLIGENCE

FIELD OF THE INVENTION

The present application relates to security analytics technologies, surveillance technologies, artificial intelligence technologies, machine learning technologies, cloud-computing technologies, data analysis technologies, and, more particularly, to a system and method for providing security analytics from surveillance systems using artificial intelligence.

BACKGROUND

In today's society, it has become increasingly important to be able to detect, thwart, and respond to events, actions, and crimes in a more effective and expeditious manner. For example, such abilities are especially important in the context of active-shooter situations, potential terrorist activities, mass-shooter situations, biological or chemical attacks, suspicious behavior, and/or other events of interest. Being able to effectively and expeditiously detect and respond to such events can substantially reduce casualties, injuries, financial costs, healthcare costs, rebuilding costs, disruptions, and other negative consequences. Currently, there are a variety of technologies, methodologies, and techniques utilized to detect and respond to such events. Such technologies, methodologies, and techniques include, but not limited to, camera systems, card access systems, biometric authentication systems, security guards, various types of sensors, alarm systems, or a combination thereof. Such technologies have been helpful in reducing the impact of dangerous events. For examples, current camera systems are often monitored by security guards during the day and night to determine whether suspicious activity is occurring. If suspicious activity is occurring, the security guard may inspect the situation himself, call for backup, or notify the police. Card access systems and biometric authentication systems have been helpful in preventing unauthorized individuals from entering an entry point of a building or location. Furthermore, various types of sensors, such as motion sensors, have been utilized to trigger alarms, alerts, and/or various types responses if motion is detected at a time when motion is not expected to occur Nevertheless, despite the foregoing, there remains room for substantial enhancements to existing technologies and processes and for the development of new technologies and processes to detect suspicious or dangerous activity, while also ensuring an effective and timely response. While currently existing technologies provide for various benefits, such technologies still come with various drawbacks and inefficiencies. For example, currently existing processes and technologies often do not detect or prevent dangerous activity early enough or fast enough to have meaningful impact, especially when it comes to reducing potential negative consequences. Additionally, existing technologies are often tailored to detect a specific type of dangerous activity and often fail to detect types of activities that are outside the detection capabilities of such technologies. Furthermore, while currently existing processes may have short-term effectiveness on a case-by-case basis, existing technologies often fail to have a lasting deterrent effect on criminals conducting criminal activity. Moreover, existing technologies fail to take advantage of artificial intelligence technologies that would assist a system in adapting to changing conditions and activities. Based on the foregoing, current technologies may be improved and enhanced so as to provide for more effective monitoring, greater quality data, faster detection of suspicious and/or dangerous behaviors, more effective intervention and/or response processes, higher quality predictive capabilities, and more effective identification of dangerous individuals, events, and/or activities. Such enhancements and improvements to methodologies and technologies may provide for enhanced threat mitigation capabilities, reduced negative consequences, increased safety, and dynamic detection and response capabilities.

SUMMARY

A system and accompanying methods for providing security analytics from surveillance systems using artificial intelligence are disclosed. In particular, the system and methods utilize a variety of sensors in combination with artificial intelligence models to effectively detect suspicious and/or dangerous individuals, activity, occurrences, anomalies, actions, situations, or a combination thereof. In operation, the system and methods may include capturing content and/or data from devices and/or systems monitoring an environment of interest. The captured content and/or data may be loaded into artificial intelligence models that have been trained to recognize patterns, behaviors, objects, activities, individuals, and/or other items of interest. Such artificial intelligence models may be trained to recognize the patterns, behaviors objects, activities, individuals, and/or other items of interest based on analyzing other content and/or data that have been fed into the models previously. The effectiveness and detection capability of the artificial intelligence models may be enhanced as the models receive additional content and/or data over time. The captured content and/or data may be compared to the content and/or data used to train the models and/or to deductions, reasoning, intelligence, correlations, outputs, analyses, and/or other information that the artificial intelligence model(s) learned based on the content and/or data used to train the models.

Based on the comparison, the system and methods may generate a prediction relating to the detection of an object, activity, motion, action, occurrence, anomaly, or a combination thereof, existing in the monitored environment. For example, if there is a correlation between the captured content and data with the content used to train the artificial intelligence models, the artificial intelligence models may determine that a specific object is in the environment. Once a prediction is made, the system and methods may then include generating a confidence score associated with the prediction relating to the detection of the object, activity, motion, action, occurrence, anomaly, or a combination thereof. If the confidence score is at or above a specified threshold, the system and methods may include facilitating output of a response in response to the detection. For example, if the artificial intelligence model detects that a man with a gun is in the environment, the system and methods may include generating an alert, contacting police, and/or activating defense systems to counter a potential attack by the man. Notably, the captured content and/or data may be utilized to further train the artificial intelligence models so that on future occasions the detection, predictions, and/or confidence scores may be enhanced.

In one embodiment, a system for providing security analytics from surveillance systems using artificial intelligence is provided. The system may include a memory that stores instructions and a processor that executes the instructions to perform various operations of the system. The system may perform an operation that includes capturing first content generated by a sensor(s) monitoring an environment of interest. The first content may be content that includes sensor data from any number of sensors that belong to a surveillance system of the system. Once the first content is obtained from the sensor(s), the system may perform an operation that includes loading the first content into an artificial intelligence model(s) for analysis. By utilizing the artificial intelligence model, the system may perform an operation that includes comparing the first content to second content that is associated with the artificial intelligence model and/or that has been utilized to train the artificial intelligence model. If the first content correlates with and/or matches the second content, the system may perform an operation that includes generating a prediction relating to detection of an object, an activity, a motion, an action, an occurrence, an anomaly, or a combination thereof, in the environment. The system may proceed to perform an operation that includes generating a confidence score for the prediction relating to the detection of the object, the activity, the motion, the action, the occurrence, the anomaly, or a combination thereof, in the environment. If the confidence score is at or above a threshold value, the system may perform an operation that includes facilitating output of a response to the detected object, activity, motion, action, occurrence, anomaly, or a combination thereof, in the environment.

In another embodiment, a method for providing security analytics from surveillance systems using artificial intelligence is disclosed. The method may include a memory that stores instructions and a processor that executes the instructions to perform the functionality of the method. In particular, the method may include capturing first content generated by one or more sensors that are utilized to monitor an environment. In certain embodiments, the sensors may be part of one or more surveillance systems that are utilized to monitor the environment. The first content, for example, may include sensor data, such as, but not limited to, audio content, video content, temperature content, humidity content, speed content, orientation content, biometric content, any type of sensor data and/or content, or a combination thereof. The method may include loading the first content into an artificial intelligence model(s) for analysis. Additionally, the method may include comparing, such as by utilizing the artificial intelligence model(s), the first content to second content associated with and/or utilized to train the functionality of the artificial intelligence model(s). The method may then include generating, based on the first content correlating and/or matching with the second content, a prediction relating to the detection of an object, an activity, a motion, an action, an occurrence, an anomaly, or a combination thereof. Based on the strength of the matching and/or correlation and/or other factors, the method may include providing a confidence score for the prediction relating to the detection of the object, the activity, the motion, the action, the occurrence, the anomaly, or a combination thereof. If the confidence score is at or above a threshold value for generating a response, the method may include facilitating output of such a response in response to the detection.

According to yet another embodiment, a computer-readable device comprising instructions, which, when loaded and executed by a processor cause the processor to perform operations, the operations comprising: capturing first content generated by a sensor, wherein the first content is associated with an environment to be monitored; loading the first content into an artificial intelligence model for analysis; comparing, by utilizing the artificial intelligence model, the first content to second content associated with the artificial intelligence model; determining, based on the first content correlating with the second content, a prediction relating to detection of an object, an activity, a motion, an action, an occurrence, an anomaly, or a combination thereof; determining a confidence score for the prediction relating to the detection of the object, the activity, the motion, the action, the occurrence, the anomaly, or a combination thereof; and facilitating output of a response if the confidence score is at a threshold value.

These and other features of the systems and methods for providing security analytics from surveillance systems using artificial intelligence are described in the following detailed description, drawings, and appended claims.

DETAILED DESCRIPTION OF THE DRAWINGS

A system 100, subsystems 400-800, and accompanying methods (e.g. method 900) for providing security analytics from surveillance systems using artificial intelligence are disclosed. In particular, the system 100, subsystems 400-800, and methods may utilize a variety of sensors in conjunction with artificial intelligence models to effectively detect suspicious and/or dangerous individuals, activity, occurrences, anomalies, actions, situations, or a combination thereof. The system 100, subsystems 400-800, and methods may include capturing content and/or data from devices and/or systems monitoring an environment of interest (e.g. environment 127). The captured content and/or data may be loaded into artificial intelligence models that have been trained to recognize patterns, behaviors, objects, activities, individuals, and/or other items of interest. The artificial intelligence models, for example, may be trained to recognize the patterns, behaviors objects, activities, individuals, and/or other items of interest based on analyzing other content and/or data that have been loaded into the models previously. The captured content and/or data may be compared to the content and/or data used to train the models and/or to deductions, reasoning, intelligence, correlations, outputs, analyses, and/or other information that the artificial intelligence model(s) learned based on the content and/or data used to train the models.

Figure 1:
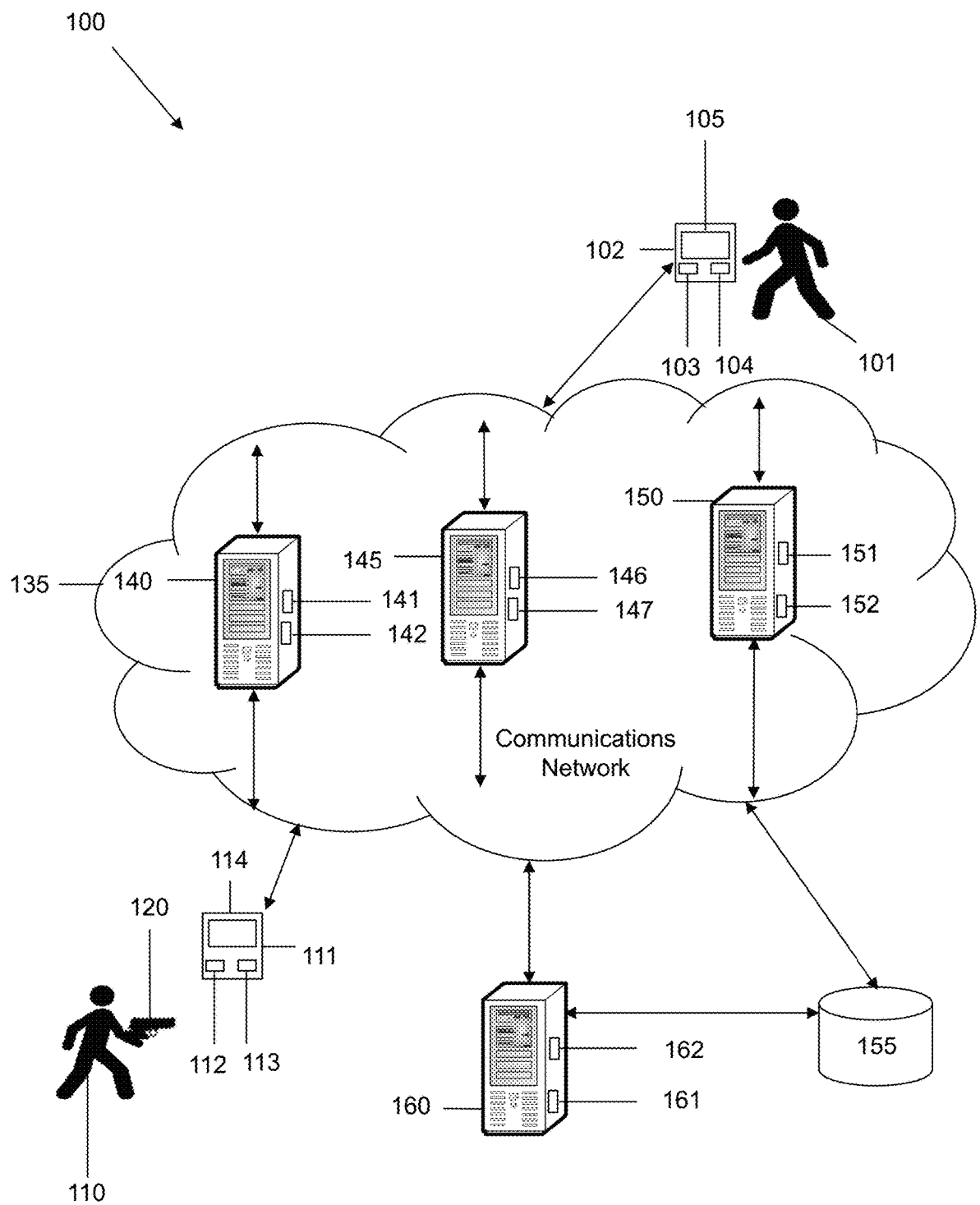
FIG. 1 is a schematic diagram of a system for providing security analytics from surveillance systems using artificial intelligence according to an embodiment of the present disclosure.

Based on the comparison, the system 100, subsystems 400-800 and methods may generate a prediction relating to the detection of an object, activity, motion, action, occurrence, anomaly, or a combination thereof, existing in the monitored environment. For example, if there is a correlation between the captured content and data with the content used to train the artificial intelligence models, the artificial intelligence models may determine that a specific object is in the environment. Once a prediction is made, the system 100, subsystems 400-800 and methods may then include generating a confidence score associated with the prediction relating to the detection of the object, activity, motion, action, occurrence, anomaly, or a combination thereof. If the confidence score is at or above a specified threshold, the system 100, subsystems 400-800, and methods may include facilitating output of a response in response to the detection. For example, if the artificial intelligence model detects that a woman is speeding towards a building, the system 100, subsystems 400-800 and methods may include generating an alert that notifies individuals in the building to flee to safety prior to impact. Notably, the captured content and/or data may be utilized to further train the artificial intelligence models so that on future occasions the detection, predictions, and/or confidence scores may be enhanced. Based on at least the foregoing, the system 100, subsystems 400-800, and methods provide enhanced threat detection and response capabilities As shown in FIG. 1 and referring also to FIGS. 2-10, a system 100 and subsystems 400, 500, 600, 700, 800 for providing security analytics from surveillance systems using artificial intelligence are disclosed. Notably, the system 100 may be configured to support, but is not limited to supporting, surveillance and monitoring systems and services, alert systems and services, data analytics systems and services, data collation and processing systems and services, artificial intelligence services and systems, machine learning services and systems, security systems and services, content delivery services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. As another example, the first user device 102 may be utilized to access an application, devices, and/or components of the system 100 that provide any or all of the operative functions of the system 100. In certain embodiments, the first user 101 may be a bystander, any type of person, a robot, a humanoid, a program, a computer, any type of user, or a combination thereof, that may be located in a particular environment. In certain embodiments, the first user 101 may be a person that may want to conduct or assist in conducting surveillance for an environment, location, zone, and/or place of interest. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1. In certain embodiments, the first user device 102 may be utilized by the first user 101 to control and/or provide some or all of the operative functionality of the system 100.

In addition to using first user device 102, the first user 101 may also utilize and/or have access to additional user devices. As with first user device 102, the first user 101 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the first user device 102 and/or the additional user devices may be and/or may include a computer, any type of sensor, a laptop, a set-top-box, a tablet device, a phablet, a server, a mobile device, a smartphone, a smart watch, and/or any other type of computing device, and/or any combination thereof. Sensors may include, but are not limited to, cameras, motion sensors, acoustic/audio sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof.

The first user device 102 and/or additional user devices may belong to and/or form a communications network. In certain embodiments, the communications network may be a local, mesh, or other network that enables and/or facilitates various aspects of the functionality of the system 100. In certain embodiments, the communications network may be formed between the first user device 102 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 100 and/or outside the system 100.

In certain embodiments, the first user device 102 and additional user devices belonging to the communications network may share and exchange data with each other via the communications network. For example, the user devices may share information relating to the various components of the user devices, information associated with images and/or content accessed by a user of the user devices, information identifying the locations of the user devices, information indicating the types of sensors that are contained in and/or on the user devices, information identifying the applications being utilized on the user devices, information identifying how the user devices are being utilized by a user, information identifying user profiles for users of the user devices, information identifying device profiles for the user devices, information identifying the number of devices in the communications network, information identifying devices being added to or removed from the communications network, any other information, or any combination thereof.

In addition to the first user 101, the system 100 may also include a second user 110. The second user 110 may be a person that may be a potential person of interest for a variety of reasons. In certain embodiments, for example, the second user 110 may be a criminal, a terrorist, a regular person, a person that needs to be tracked, and/or any type of person. In certain embodiments, the second user device 111 may be utilized by the second user 110 to transmit signals to request various types of content, services, and data provided by and/or accessible by communications network 135 or any other network in the system 100. In further embodiments, the second user 110 may be a robot, a computer, a vehicle (e.g. semi or fully-automated vehicle), a humanoid, an animal, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the first user 101 to interact with various applications executing on the second user device 111 and, in certain embodiments, to interact with the system 100. In certain embodiments, the second user device 111 may be a computer, a laptop, a set-top-box, a tablet device, a phablet, a server, a mobile device, a smartphone, a smart watch, and/or any other type of computing device. Illustratively, the second user device 111 is shown as a mobile device in FIG. 1. In certain embodiments, the second user device 111 may also include sensors, such as, but are not limited to, cameras, audio sensors, motion sensors, pressure sensors, temperature sensors, light sensors, heart-rate sensors, blood pressure sensors, sweat detection sensors, breath-detection sensors, stress-detection sensors, any type of health sensor, humidity sensors, any type of sensors, or a combination thereof.

In certain embodiments, the first user device 102, the additional user devices, and/or potentially the second user device 111 (e.g. if the second user 110 is determined to not be a threat) may have any number of software applications and/or application services stored and/or accessible thereon. For example, the first user device 102, the additional user devices, and/or potentially the second user device 111 (e.g. if the second user 110 is determined to not be a threat by the system 100) may include applications for controlling and/or accessing the operative features and functionality of the system 100, applications for controlling and/or accessing any device of the system 100, interactive social media applications, biometric applications, cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and/or potentially second users 101, 110 to readily interact with the software applications. The software applications and services may also be utilized by the first and/or potentially second users 101, 110 to interact with any device in the system 100, any network in the system 100, or any combination thereof. In certain embodiments, the first user device 102, the additional user devices, and/or potentially the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, the first user 101, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or may be connected to a processor and memory to perform the various operation associated with the database 155. In certain embodiments, the database 155 may be connected to the servers 140, 145, 150, 160, the first user device 102, the second user device 111, the additional user devices, any devices in the system 100, any process of the system 100, any program of the system 100, any other device, any network, or any combination thereof.

The database 155 may also store information and metadata obtained from the system 100, store metadata and other information associated with the first and second users 101, 110, store artificial intelligence models utilized in the system 100, store sensor data and/or content obtained from an environment, store predictions made by the system 100 and/or artificial intelligence models, storing confidence scores relating to predictions made, store threshold values for confidence scores, responses outputted and/or facilitated by the system 100 and/or subsystems 400-800, store information associated with anything detected via the system 100 and/or subsystems 400-800, store information and/or content utilized to train the artificial intelligence models, store information associated with behaviors and/or actions conducted by individuals, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

Figure 2:
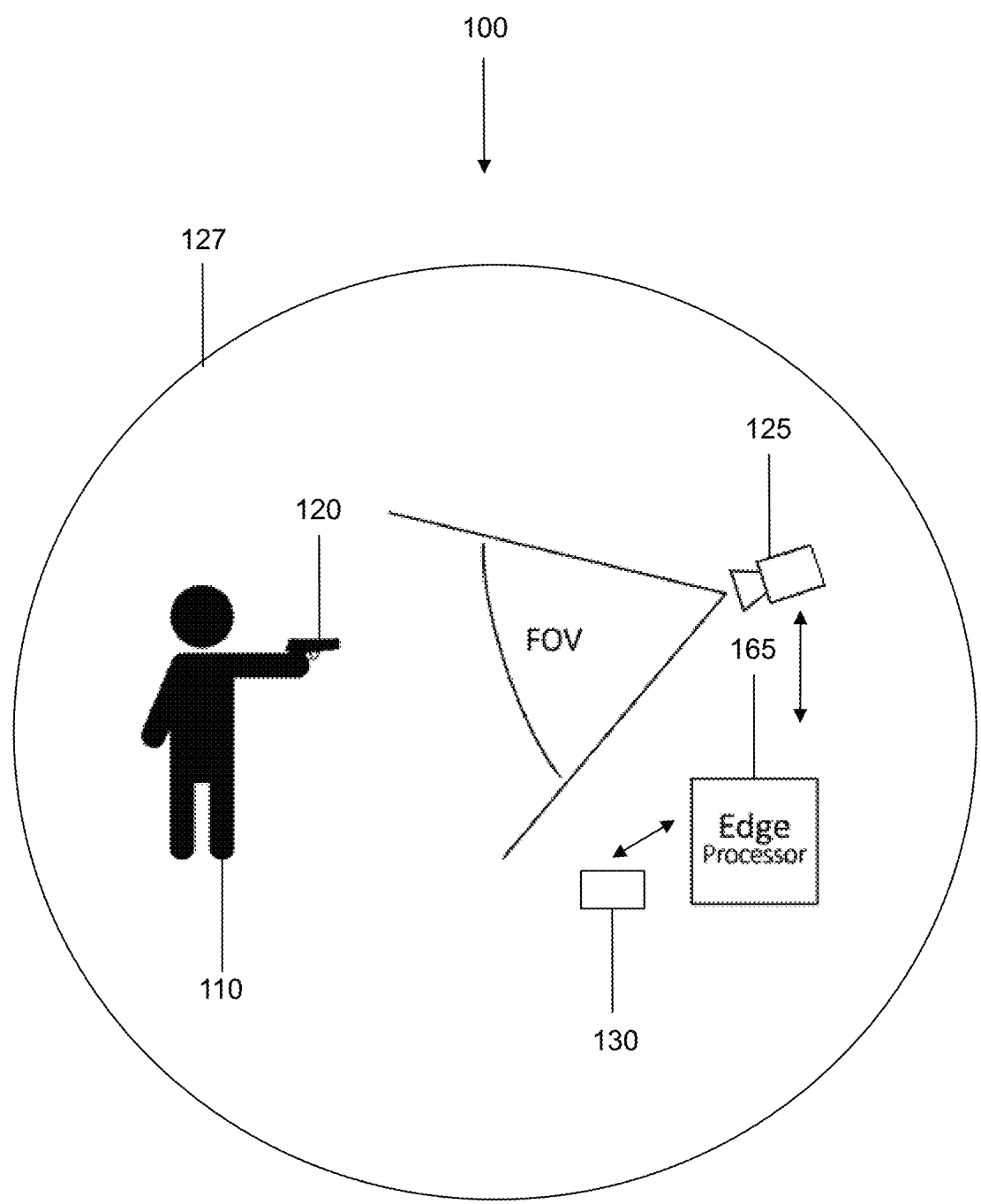
FIG. 2 is a system for use with the system of FIG. 1, which illustrates the use of camera sensors to facilitate weapons and/or gunshot detection.
Figure 3:
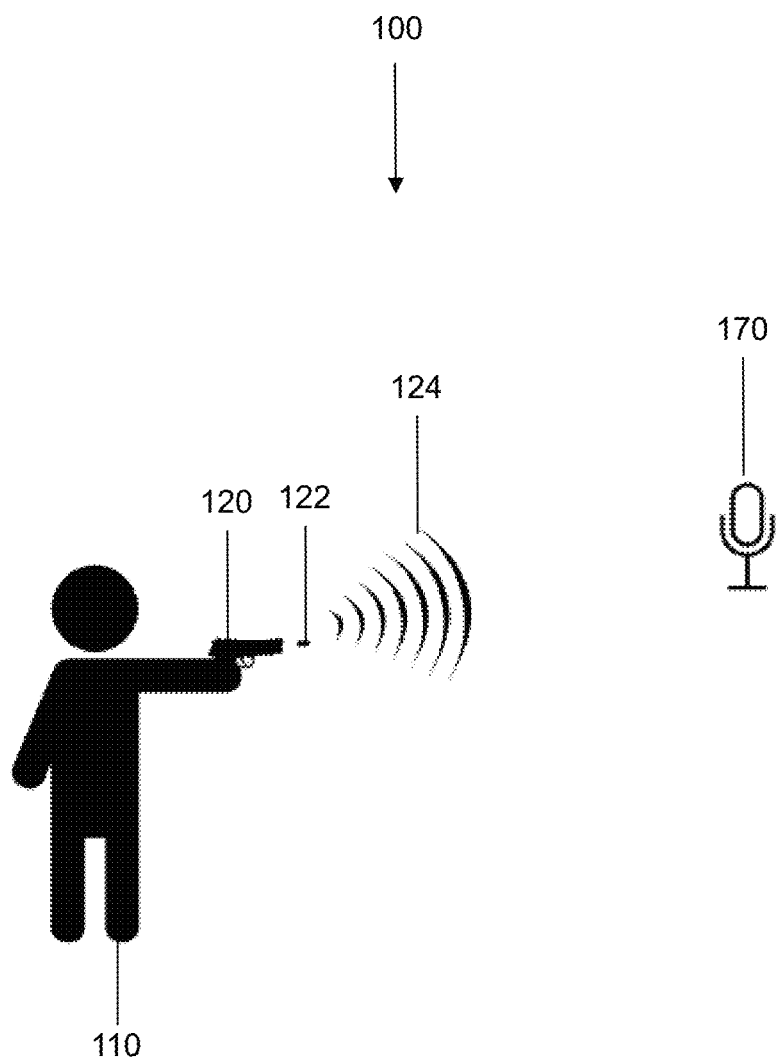
FIG. 3 is a system for use with the system of FIG. 1, which illustrates the use of audio sensors to facilitate weapons and/or gunshot detection.

The system 100 may include a camera 125. The camera 125 may be any type of camera including, but not limited to, a monitor camera, a DSLR camera, a film camera, an action camera, a motion-sensor-based camera, an infrared camera, a projection camera, a 360-degree camera, a mobile camera, any type of camera, or a combination thereof. The camera 125 may be configured to capture video content, audio content, image content, any type of content, or a combination thereof. In certain embodiments, content frames 175 associated with the content may be provided by the camera 125 to componentry of the system 100 (e.g. processor 180) so that the content frames 175 may be analyzed, processed, and/or modified. In certain embodiments, the content frames 175 may include frames of video content, audio content, virtual reality content, augmented reality content, haptic content, audiovisual content, any type of content, or a combination thereof. Notably, the system 100 may include any number of cameras 125 positioned at any suitable location with an environment 127, which may be utilized to monitor activity or anything occurring in the environment 127. The camera(s) 125 may have a field of view, as illustrated in FIG. 2, which may encompass any desired range for the specific monitoring situation. In certain embodiments, the camera(s) 125 may have 360-degree views or other degree views. The system 100 may also include or reside within an environment 127, which may be any type of environment. For example, the environment 127 may be a home, an airport, a train station, a movie theater, a sports arena, an office building, a highway, a race track, a condominium, a hotel, a park, a forest, an ocean, a body of water, any type of environment, or a combination thereof.

In certain embodiments, the system 100 may include an edge device 165, such as an edge processor, edge server, and/or any other type of edge device. In certain embodiments, the edge device 165 may serve as a device that serves as an entry point into a core network and/or as an intermediary device between one or more networks. For example, the edge device 165 may be a device connecting one or more networks with communications network 135. In certain embodiments, the edge device 165 may be a router, a switch, an access device, a multiplexer, a server, any type of edge device, or a combination thereof. In certain embodiments, the edge device 165 may be configured to translate between network protocols utilized by one network and one or more connected networks. The system 100 may include any number of edge devices 165 and the edge devices 165 may be allocated to a client and/or user of the system 100 based on desired and/or required needs. In certain embodiments, the edge device 165 may execute lightweight containerized inference code and may act as dedicated hardware for a video, audio, and/or other type of source of content and/or data. In certain embodiments, one or more edge devices 165 may be managed by a device hub in a cloud network (e.g. communications network 135) so that actions on the edge device(s) 165 may be performed remotely. In certain embodiments, the edge device(s) 165 may be configured to process and store data traversing the system 100 locally to facilitate and maintain the privacy of client data. The latency to the edge device(s) 165 may be insignificant because the computing power may be provided on premises.

In addition to the edge device(s) 165, the system 100 may include any number of sensors 130. The sensors 130 may be any type of sensor that can measure sensor data occurring in and/or about the environment 127. In certain embodiments, the sensors 130 may include, but are not limited to, cameras, pressure sensors, temperature sensors, acoustic sensors, humidity sensors, motion sensors, light sensors, chemical detection sensors, heart rate sensors, infrared sensors, thermal sensors, proximity sensors, radiation sensors, position sensors, GPS sensors, particle sensors, any type of sensors, or a combination thereof. The sensors, for example, may be utilized to obtain information associated with the environment 127 and/or people, animals, things, objects, and/or anything else existing on the environment 127. For example, motion sensors may be utilized to track the movements of a user, such as second user 110. Additionally, thermal/temperature sensors may be configured to detect the body temperature of the second user 110 and/or provide a thermal image of the second user 110.

In certain embodiments, the system 100 may include one or more audio sensors 170. In certain embodiments, an audio sensor 170 may be a microphone, a sound sensor, any type of device capable of detecting sound waves and converting the sound waves into electrical signals for use by the system 100 and/or subsystems 400-800, a voice activity assistant, a smart device, any type of audio sensor, or a combination thereof. The audio sensors 170 may be configured to detect sounds occurring in the environment 127, for example, and may be configured to transmit electrical signals associated with detected sounds to componentry of the system 100 and/or subsystems 400-800 for analysis, processing, and/or storage. In certain embodiments, the signals may be provided to artificial intelligence models supporting the functionality of the system and/or subsystems 400-800 to facilitate the detection of sounds, such as, but not limited to, gunshot sounds, ballistic weapon sounds, sounds associated with distress, sounds associated with certain activities and/or actions, any type of sound of interest, or a combination thereof, that may prompt or trigger the generation of responses by the system 100.

The system 100 may also include any number of subsystems including, but not limited to, subsystem 400, subsystem 500, subsystem 600, subsystem 700, subsystem 800, any other subsystem, or a combination thereof. In certain embodiments, the subsystems 400-800 may be separate from the system 100 and/or be partially within the system 100. In certain embodiments, the subsystems 400-800 may exchange data, information, signals, algorithms, artificial intelligence models, analyses, content, anything transferrable, or a combination thereof, between each other and/or the system 100. In certain embodiments, the subsystems 400-800 may be configured to facilitate the operation of the system 100 and/or the subsystems 400-800, and may be configured to provide processing, storage, and/or communication resources, such as on-demand. In certain embodiments, the subsystems 400-800 may be each tailored to work in specific use-case scenarios. For example, subsystems 400, 500 may be configured to be utilized in scenarios involving the detection of an object, an activity, a motion, an action, an occurrence, an anomaly, or a combination thereof, based on video content and/or audio content captured from an environment 127. Subsystems 600, 700 may take advantage of Internet of Things devices, cloud computing, edge devices, and/or camera devices. Subsystem 800 may involve utilizing multiple different types of analysis and artificial intelligence techniques to determine whether an object, an activity, a motion, an action, an occurrence, an anomaly, or a combination thereof, has been detected in an environment 127.

Figure 4:
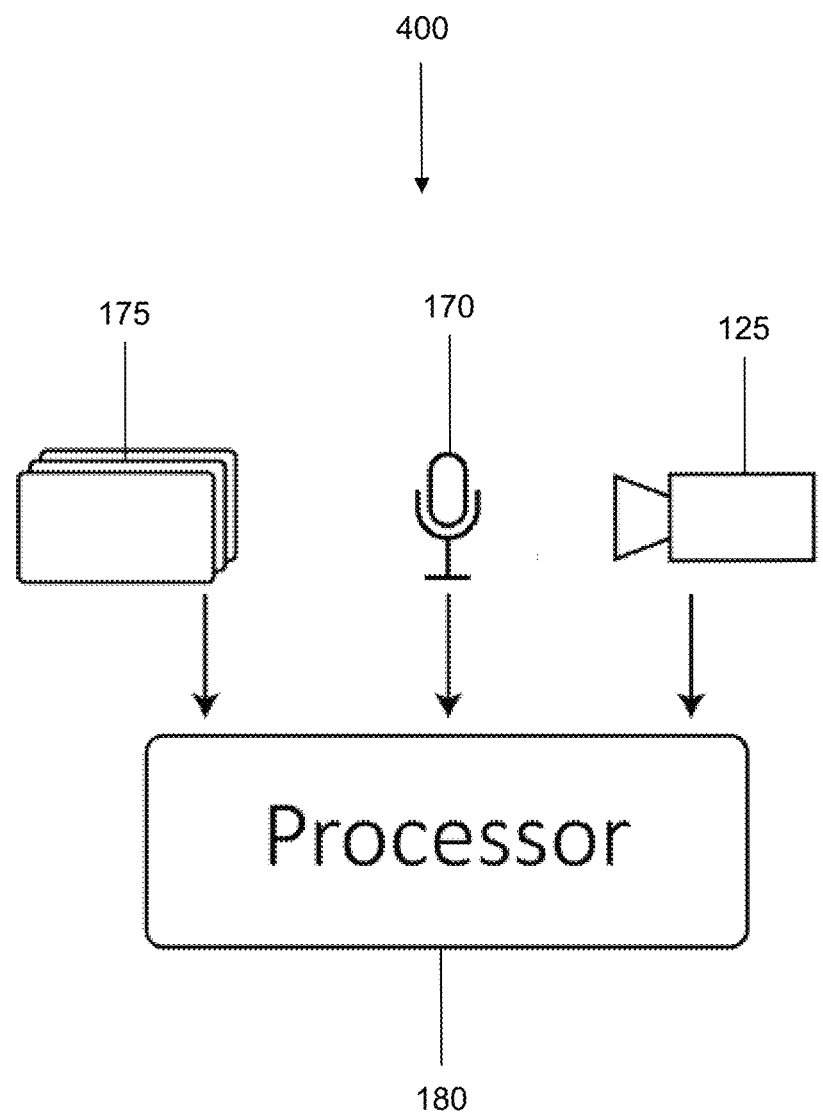
FIG. 4 is a system for use with the system of FIG. 1, which illustrates the use of audio sensors, camera sensors, image frames, and processors to facilitate detection of objects, occurrences, motions, actions, occurrences, and/or anomalies.

In certain embodiments, subsystem 400, as shown in FIG. 4, may include a camera 125, an audio sensor 170, content frames 175, a processor 180, any components of system 100, any components of subsystems 500-800, or a combination thereof. The camera 125 may be the same camera 125 of system 100 or may be any number of additional cameras 125 that may be utilized with or separate from the camera 125 of the system 100. Notably, the camera 125 may include any of the componentry and/or functionality of the camera 125 of the system 100. Content captured by the camera 125 may include image frames 175 (or other types of content frames). For example, the content may be content captured of an environment 127 being monitored by the subsystem 400 and the system 100. Similarly, the audio sensor 170 may be utilized to detect sound waves and/or audio signals occurring in an environment 127 and convert the sound waves and/or audio signals into electrical signals. The image frames 175 and/or audio signals (and/or electrical signals) may be provided to a processor 180 for processing and analysis. In certain embodiments, the processor 180 may be software, hardware, or a combination of software and hardware. The processor 180 may be configured to execute instructions, such as from one or more memories of the system and/or from a cache memory present on the processor 180 itself.

In certain embodiments, the processor 180 may be utilized to perform operations supporting the operations and functionality provided by one or more artificial intelligence models supporting the functionality of the system 100 and/or subsystems 400-800. In certain embodiments, an artificial intelligence model may be a file, program, module, and/or process that may be trained by the system 100 (or other system and/or subsystem described herein) to recognize certain patterns, behaviors, and/or content. For example, the artificial intelligence model(s) may be trained to detect specific types of objects, activity, occurrences, actions, motion, speed, and/or anything of interest exiting and/or occurring in an environment 127. In certain embodiments, the artificial intelligence model may be, may include, and/or may utilize a Deep Convolutional Neural Network, a one-dimensional convolutional neural network, a two-dimensional convolutional neural network, a Long Short-Term Memory network, any type of machine learning system, any type of artificial intelligence system, or a combination thereof. Additionally, in certain embodiments, the artificial intelligence model may incorporate the use of any type of artificial intelligence and/or machine learning algorithms to facilitate the operation of the artificial intelligence model(s).

The system 100 may train the artificial intelligence model(s) to reason and learn from data fed into the system 100 so that the model may generate and/or facilitate the generation of predictions about new data and information that is fed into the system 100 for analysis. For example, the system 100 may train an artificial intelligence model using various types of data and/or content, such as, but not limited to, images, video content, audio content, text content, augmented reality content, virtual reality content, information relating to patterns, information relating to behaviors, information relating to characteristics of objects, motions, activities, and/or occurrences, information relating to environments, sensor data, any data associate with the foregoing, any type of data, or a combination thereof. In certain embodiments, the content and/or data utilized to train the artificial intelligence model may be utilized to correlate and/or associate such content and/or data to objects, activities, motions, occurrences, anomalies, and/or other items of interest in an environment 127. As additional data and/or content is fed into the model(s) over time, the model's ability to recognize objects, activities, persons, and/or items of interest will improve and be more finely tuned. The subsystem 400 may utilize the artificial intelligence models to facilitate security analytics and surveillance of environments of interest, such as in conjunction with the system 100 and/or subsystems 500-800.

Figure 5:
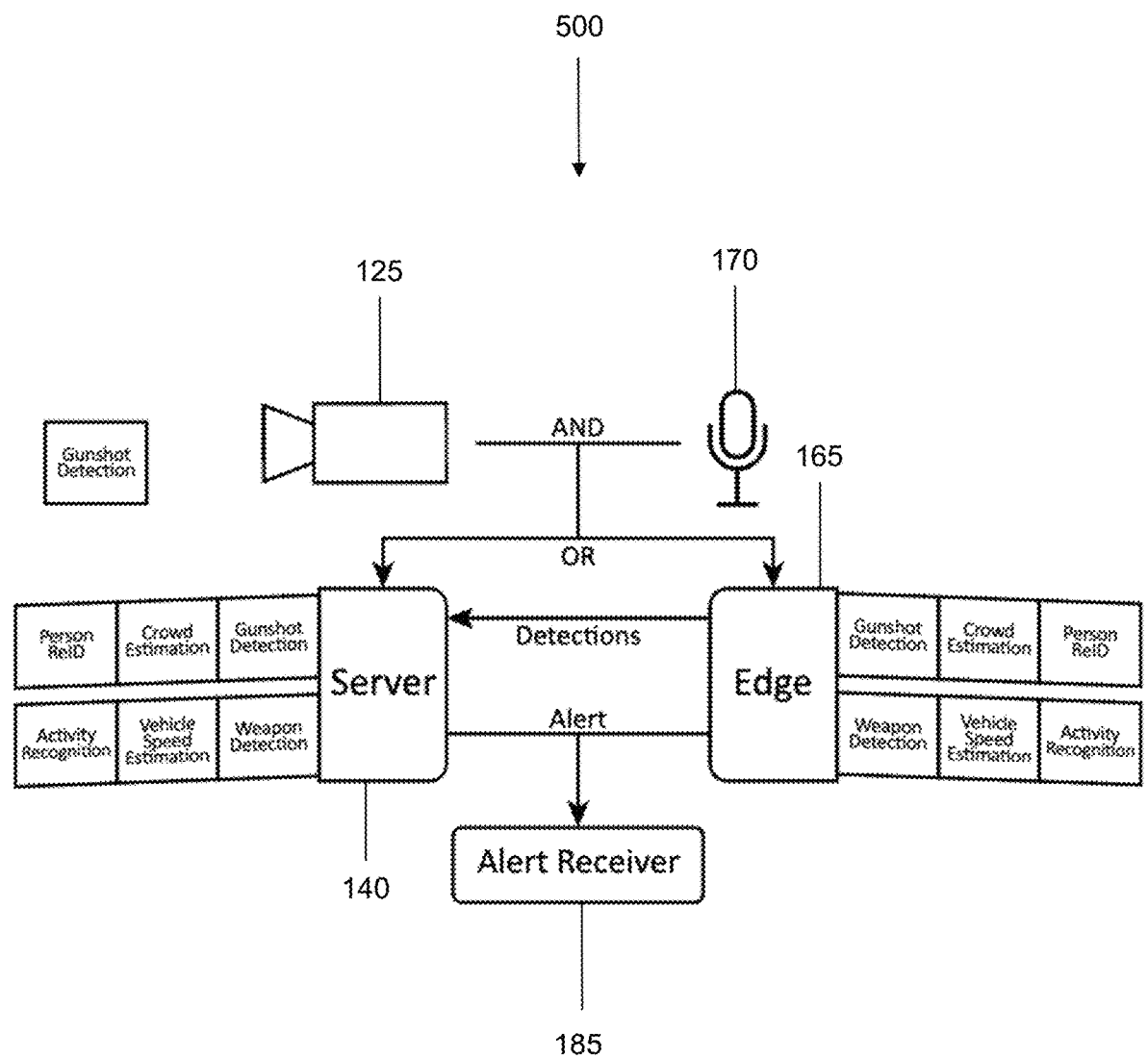
FIG. 5 is a system for use with the system of FIG. 1, which illustrates a plurality of sensors that are utilized to facilitate various types of detections and generate alerts.

With regard to subsystem 500, as shown in FIG. 5, the subsystem 500 may include, in certain embodiments, a camera 125, a server 140, an edge device 165, an audio sensor 170, an alert receiver 185, any components of subsystems 500-800, or a combination thereof. The camera 125 may be the same or similar to the cameras 125 of system 100 and/or subsystem 400. Additionally, the camera 125 may include any of the componentry and/or functionality of the camera 125 of the system 100. Audio content and/or visual content associated with an environment being monitored by the camera 125 may be captured by the camera 125. Similarly, the audio sensor 170 may be configured to capture audio content (and/or signals) occurring in the environment 127. The video content, audio content, and/or other content captured by the camera 125 and/or audio sensor 175 may be provided to server 140 and/or edge device 165 for processing and/or analysis. Artificial intelligence models accessible by the server 140 and/or edge device 165 may analyze the content to facilitate detection of objects, activities, motions, occurrences, anomalies, and/or other items of interest in an environment 127. For example, the server 140 and/or edge device 165 may be configured to detect specific people (and animals and other living things), a crowd size, a gunshot, a specific type of activity, a speed of a vehicle, a type of weapon or object, reidentification of a person (i.e. a person that has been recognized by the system 100 in the past or a person that has a corresponding record in the system 100), or a combination thereof.

In certain embodiments, the edge device 165 may perform a preliminary detection and the preliminary detection may be provided to the server 140, which may conduct a confirmatory detection. In certain embodiments, the server 140 may conduct the preliminary detection and may provide the preliminary detection to the edge device 165, which may conduct a confirmatory detection. If the server 140 and/or edge device 165 detect any objects, activities, motions, occurrences, anomalies, and/or other items of interest in the environment 127, the server 140 and/or edge device 165 may generate alerts, which may be provided to an alert receiver 185. The alert receiver 185 may be software, hardware, or a combination of hardware and software. In certain embodiments, the alert receiver 185 may provide the received alerts to any device of the system 100, any devices of the subsystems 400-800, or a combination thereof. In certain embodiments, the alert receiver 185 may be configured to store alerts, transmit alerts to other devices and/or systems, output alerts, and/or modify alerts. For example, in the event that an active shooter is detected in an environment 127, such as at an airport, the server 140 and/or edge device 165 may generate alerts and provide them to the alert receiver 185. In certain embodiments, the alert receiver 185 may output the alert in an audible, visual, haptic, sensory, and/or other type of alert that may be perceived by a user, such as first user 101, and/or by a device. After the alert is received and/or perceived, a response for dealing with the detected objects, activities, motions, occurrences, anomalies, and/or other items of interest in the environment 127 may be initiated by the system 100.

Figure 6:
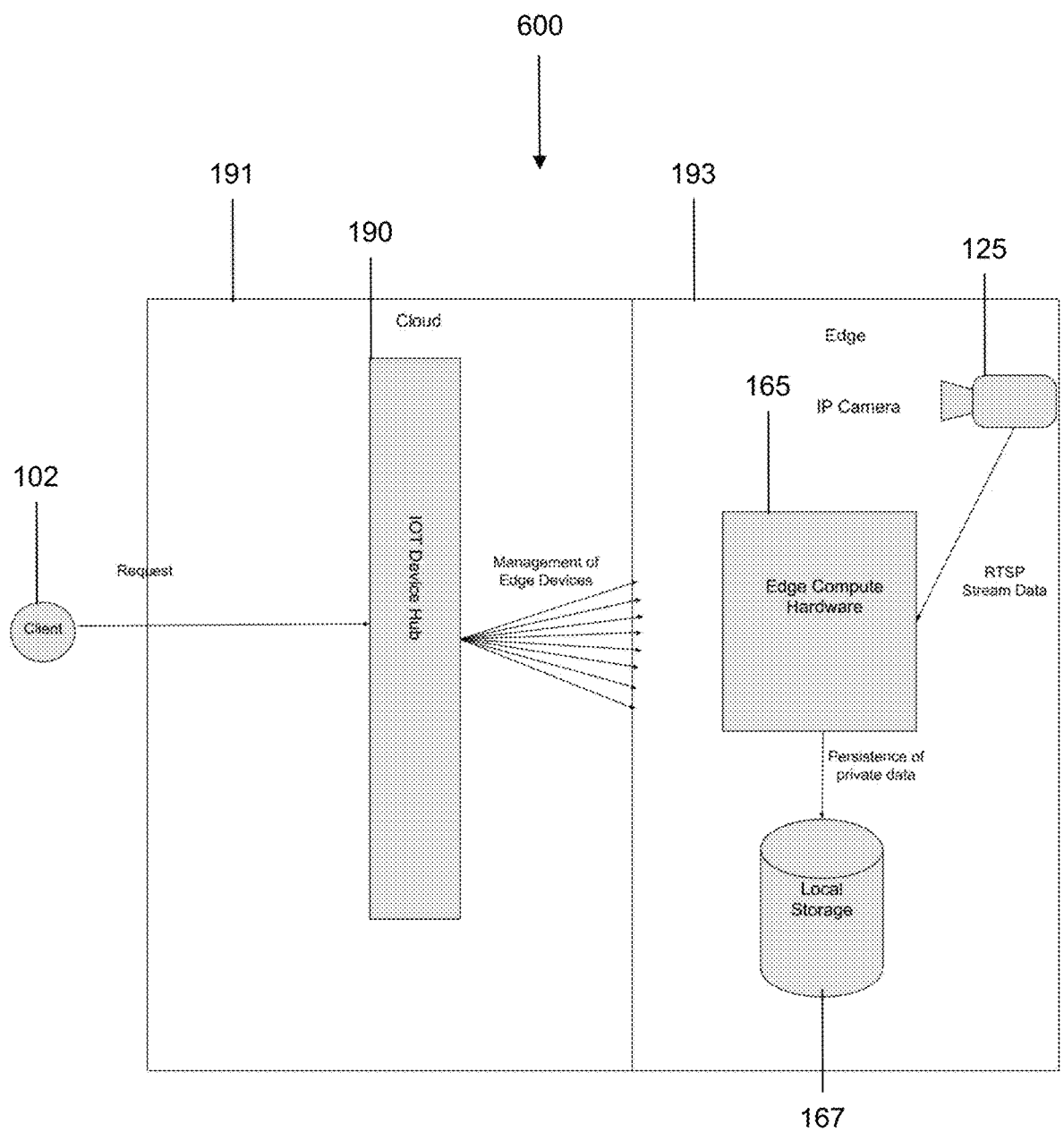
FIG. 6 is a system for use with the system of FIG. 1, which provides further details relating to componentry including cloud and edge systems utilized to facilitate operation of the system of FIG. 1.

Referring now also to FIG. 6, a subsystem 600 providing a sample edge configuration/infrastructure to support the functionality of the system 100 is provided. The subsystem 600 may include a client 102 (e.g., may correspond to first user device 102 of system 100), a device hub 190 (e.g., an Internet of Things device hub or other device hub), a cloud portion 191, an edge portion 193, an edge device 165, a local storage 167, a camera 125, and/or any other devices and/or systems. The client 102 (e.g., first user device 102) may be any type of device including, but not limited to, a server, a computer, a laptop, a smart device, a mobile device, any type of device or a combination thereof. In certain embodiments, the client 102 may be controlled by the first user 101. In certain embodiments, the client 102 may transmit requests associated with surveilling an environment 127 to the cloud portion 191, which may be received by the device hub 190. In certain embodiments, the requests from the client 102 may be utilized to add inference on a video/audio/or other content source. The device hub 190 operating in the cloud portion 191 of the subsystem 600 may be utilized to manage and control edge devices 165 in the edge portion 193 of the subsystem 600. In certain embodiments, the edge portion 193 may include any number of edge devices 165, local storages 167 for storing data and/or content, and/or cameras 125 (or other surveillance devices).

In certain embodiments, an edge approach may be utilized to allocate edge devices 165 based on a client's 102 needs. In certain embodiments, the edge devices 165 may execute lightweight containerized inference code and may act as dedicated hardware for a video and/or audio source (e.g. cameras 125, microphones, speakers, etc.). The edge devices 165 may be managed by the device hub 190 so that actions on the edge devices 165 may be performed remotely. For example, the device hub 190 may activate or deactivate certain edge devices 165, cause the edge devices 165 to obtain data from content sources, cause the edge devices 165 to transmit data to local storages 167, cause the edge devices 165 to analyze the content and/or data obtained from content sources to detect objects, activities, motions, occurrences, anomalies, and/or other items of interest in the environment 127, facilitate in training artificial intelligence models residing on edge devices 165, transmit data and/or content to clients 102, transmit and/or generate responses to detections to the clients 102, adjust an amount of processing resources used by the edge devices 165 to perform various actions, and/or perform any other actions and functions. In certain embodiments, the edge devices 165 may be configured to process and store data obtained from sources of data and/or content (e.g. cameras 125). Notably, latency to edge devices 165 may be insignificant because the computing power may be located on premises at the environment 127.

Figure 7:
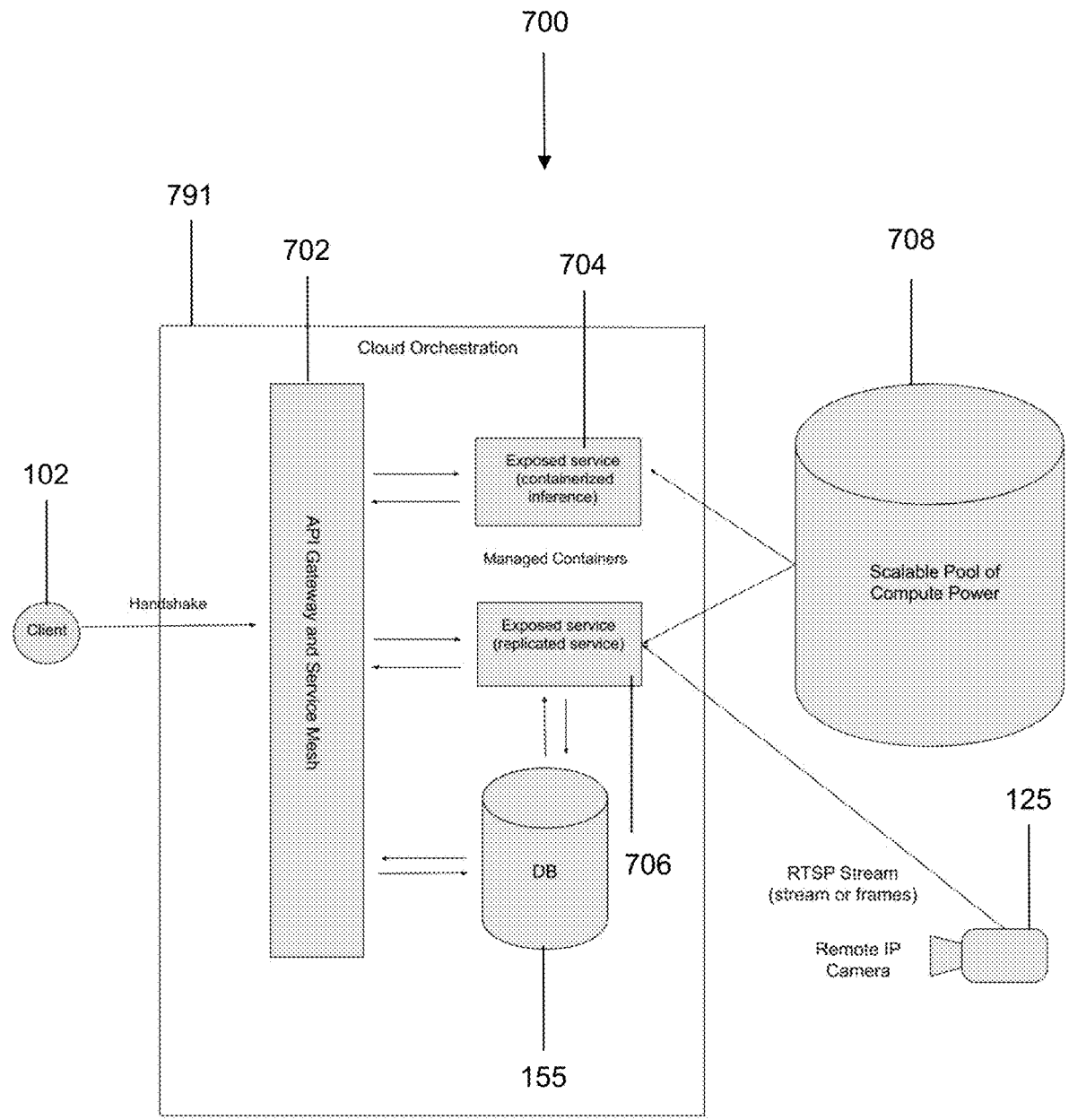
FIG. 7 is a system for use with the system of FIG. 1, which illustrates the use of various computing resources for facilitating the operation of the system of FIG. 1.

Referring now also to FIG. 7, a subsystem 700 providing a sample cloud configuration/infrastructure that may be utilized to support the functionality of the system 100 is provided. The subsystem 700 may facilitate a cloud approach that containerizes artificial intelligence models and code The subsystem 700 may include a client 102, a cloud portion 791, an API and gateway service mesh 702, a database 155, any number of containers 704, 706 (i.e., containerized code and/or models), a scalable pool of computing power system 708, a camera 125, and/or any other componentry and/or systems. In certain embodiments, the client(s) 102 may be configured to make requests to the cloud portion 191 to add inference on a video/audio source, such as content captured by a camera 125 of the subsystem 700 while monitoring an environment 127. In certain embodiments, the camera 125 may provide content to the cloud portion 791 by utilizing real-time streaming protocol and/or by utilizing any other transfer protocol. In certain embodiments, the API and gateway service mesh 702 may be configured to receive the requests from the client 102, and may be configured to serve as an orchestrator to deploy, scale, and manage the containers 704, 706 (containerized units of inference) for each video/audio/content source requested by the client 102. In certain embodiments, an advantage of using the cloud configuration/infrastructure in this manner is that the amount of computing power being used may be dynamically scaled up and down from a predetermined pool of hardware (e.g., scalable pool of computing power system 708). In certain embodiments, the subsystem 700 (and potentially the system 100) may be reliant on making network calls to a cloud data center (e.g. cloud portion 791) rather than to on premises hardware. In certain embodiments, a combination of subsystems 600 and 700 may be utilized to process and handle requests from clients 102. For example, subsystems 600 and 700 may be connected together and may be utilized simultaneously or one subsystem may be utilized under certain conditions and the other subsystem may be utilized under other conditions.

Figure 8:
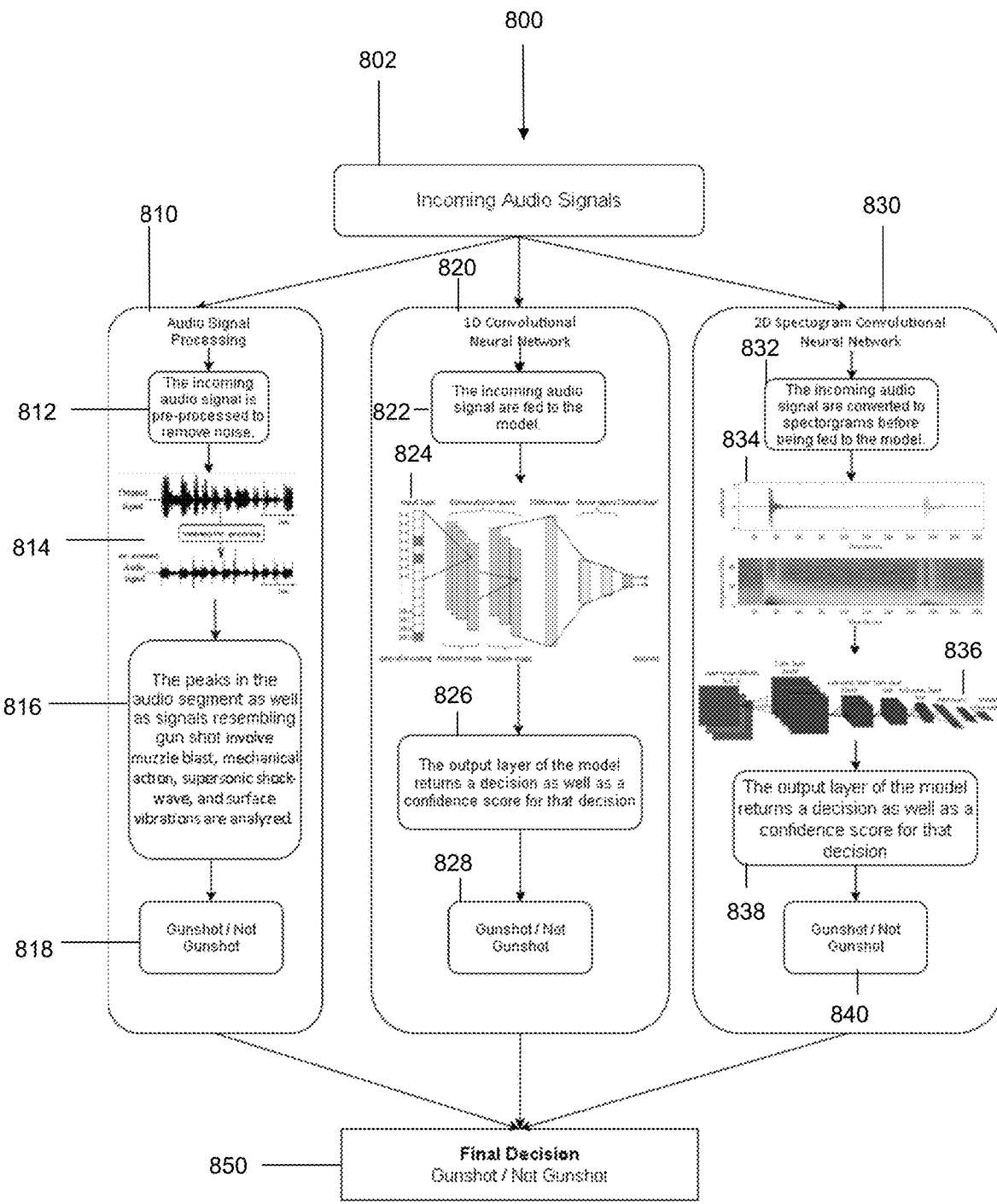
FIG. 8 is a schematic illustrating various techniques that may be utilized to facilitate detection of a gunshot using the system of FIG. 1.

Referring now also to FIG. 8, a subsystem 800 that facilitates multiple different processes and/or methods for detecting gunshots (or other objects, activity, occurrences, actions, motion, speed, and/or anything of interest) is provided. In certain embodiments, the subsystem 800 may reside within system 100 and/or any of the subsystems 400-700. In certain embodiments, the subsystem 800 may be connected and/or communicatively linked to the system 100 and/or any of the subsystems 400-700. Illustratively, the subsystem 800 in FIG. 8 is shown as processing audio signals, however, the subsystem 800 may be configured to process any type of content and/or data and/or any combination and content and/or data. For example, the subsystem 800 may be configured to process incoming video signals, audio/sound signals, augmented reality signals, haptic signals, virtual reality signals, infrared signals, radio frequency signals, optical signals, any type of content signals, any type of data signals, or a combination thereof. In a first process, which may be illustrated via steps 802, 810, 812, 814, 816, 818, and 850, incoming audio signals (or other types of signals) may be obtained at step 802. The incoming audio signals may be obtained from microphones that are present in an environment being monitored by the system 100. At step 810, the first process may include providing the incoming audio signals to an audio processing/pre-processing module of the subsystem 800. In certain embodiments, the audio processing/pre-processing module may comprise hardware, software, or a combination of software and hardware. At step 812, the first process may include conducting audio signal processing on the incoming audio signals, such as by utilizing the audio processing/pre-processing module. For example, in certain embodiments, the incoming audio signals may be pre-processed to remove noise (i.e., denoising) and/or undesired artifacts from the incoming audio signals. In certain embodiments, the incoming audio signals may be pre-processed to remove noise by utilizing a pre-processing module, which may be a software module of the subsystem 800 and/or system 100.

At step 814, the first process may include generating and/or providing representations of the original audio signals that came to the subsystem 800 and generating and/or providing representations of the pre-processed versions of the audio signals that have been processed by the audio processing/pre-processing module, such as is shown in FIG. 8. At step 816, the first process may include analyzing, such as by utilizing a detection module, the peaks in the pre-processed versions of the audio signals as well as signals resembling an activity, a motion, an action, an occurrence, an anomaly, or other thing of interest. For example, the first process may analyze the peaks of the pre-processed versions of the audio signals and also analyze signals known to be associated with gunshots, mechanical action, supersonic shockwaves, surface vibrations, muzzle blasts, and/or other signals associated with sounds of interest. Based on the analysis, the first process may include, at step 818, determining whether one or more of the pre-processed versions of the audio signals match and/or correlate with the signals known to be associated with one or more sounds and generating an output indicating whether or not a specific sound has been detected. For example, the detection module may determine that a pre-processed version of the audio signal matches and/or correlates with the signal corresponding to a gunshot.

In a second process, which may be illustrated via steps 802, 820, 822, 824, 826, and 828, another technique/methodology may be utilized to detect the occurrence of a particular sound of interest (or other type of thing of interest, such as a signal). For example, in certain embodiments, the other technique may involve utilizing a 1-dimensional convolutional neural network and module to detect a particular sound (or other objects, activity, occurrences, actions, motion, speed, and/or anything of interest). At step 802, the second process may include obtaining audio signals from an environment. At step 820 of the second process, incoming audio signals may arrive at the subsystem 800 for further processing and analysis. In As the audio signals arrive at the subsystem 800, the second process may include, at step 822, feeding the incoming audio signals to a model of the 1-dimensional convolutional neural network. At step 824, the second process may include utilizing the model to analyze any number and/or type of characteristics associated with the incoming audio signals. For example, the model may be utilized to analyze audio channels, sample rate, bit-depth, amplitude, sound intensity, pitch, tone, and/or any other characteristics associated with audio signals. In certain embodiments, the Mel-Frequency Cepstral Coefficients (MFCC) may be extracted from the audio signals in each frame with a few milliseconds as the window size, thereby giving the model the ability to analyze the frequency of the sound bite and its temporal characteristics. In certain embodiments, the convolutional network layers associated with the input layers associated with the audio signals may be segmented into the width, height, and depth dimensions, and the nodes from each layer do not necessarily have to connect directly to nodes in a following layer. As a result, this allows for feature extraction in the second process, where a window scans over the input storing data in the feature map provided by the model. As the model progresses through and conducts the feature extractions and generates the feature maps, the convolutional layers may be flattened, and dense layers may be generated. A representation of the neural network module utilized with the second process is shown in FIG. 8. As a classification step 826 the second process may include returning a 1-dimensional vector output of inference that may be delivered to the network (e.g., communications network 135). At step 826, the second process may include having the output layer of the model return a decision as a well as a confidence score for the decision relating to the detection of the sound of interest. At step 828, the second process may indicate whether the received audio signal is the particular sound of interest based on the output layer decision and the confidence score, such as if the confidence score meets a selected threshold value.

In a third process, which may be illustrated via steps 802, 832, 834, 836, 838, and 840, yet another technique/methodology may be utilized to detect the occurrence of a particular sound of interest (or other type of thing interest, such as a specific type of signal or content) For example, in certain embodiments, the third process may include the use of a convolutional neural network and artificial intelligence model. At step 802, the third process may include obtaining incoming audio signals, such as from microphones in a monitored environment. At step 830, the third process may include providing the incoming audio signals to a 2-Dimensional spectrogram convolutional neural network. At step 832, neural network may process the incoming audio signals and convert the audio signal into spectrograms. The 2-Dimensional convolutional neural network may be utilized as an image classification model. The model may be trained on spectrograms associated with occurrences, sounds, activities, objects, etc. of interest. For example, the model may be trained with spectrograms corresponding to gunshots. The model may extract the most prominent features from gunshots. When an incoming spectrogram is delivered to the model at step 834, the model compares the feature(s) with the spectrograms from the gunshot training set of spectrograms. At step 836, the model may take in the input spectrogram images, generate the convolutional layers, and utilize the output layer to return a decision as well as a confidence score for the decision, at step 838. At step 840, the third process may include determining whether a gunshot exists from the incoming audio signals based on the output layer decision and the confidence score, such as if the confidence score satisfies a selected threshold value.

Once the first, second, and/or third processes output their corresponding decisions, a final decision at step 850 may be reached. In order to reach the final decision as to whether a gunshot (or other thing of interest) has been detected in the audio signals, a weighting may be given to each of the first, second, and third processes. All three decisions made may be utilized by the network to reach a final verdict relating to whether or not a gunshot (or other thing of interest) has been detected. In certain embodiments, the final decision may be determined based on a majority decision (e.g., two or more of the models utilized in the first, second, and/or third processes agree on a particular decision). If the final verdict of the network is a gunshot, for example, the system 100 (and/or an edge device) may transmit an alert to designed devices (e.g. a cellular or other device), emails, and/or to the cloud. In certain embodiments, in the event where a microphone is being streamed via internet protocol and no edge device is being utilized, the alert may be processed similarly in the cloud. The first, second, and/or third processes may continually operate as additional audio signals arrive at the system.

Operatively, the system 100 may operate and/or execute the functionality as described in the methods (e.g. method 900 as described below) of the present disclosure and in the following use case scenarios. In a first use-case scenario, the system 100 (and other subsystems) may be utilized to facilitate ballistic weapon detection. In such a scenario, an environment may include any number of video cameras that may capture live video of what is occurring the environment. The video content may be captured from video cameras positioned in the environment, and the video content may be directly streamed to the cloud (e.g., communications network 135) or connected to an edge device. Image frames may be extracted from the real-time video signals may be loaded into a ballistic weapon detection artificial intelligence model, which may be a Deep Convolutional Neural Network that has been trained on a dataset of images that contains persons wielding weapons. The system may also detect concealed weapons by utilizing infrared cameras when people hide ballistic weapons, such as underneath their clothing. If the model outputs a prediction with a certain confidence, the edge system and/or cloud system may generate and transmit an alert to a designed device, such as a cellular or other device, transmit emails, and/or transmit an alert to the cloud.

In a second use-case scenario, the system 100 (and other subsystems) may be utilized to facilitate activity recognition, such as within an environment. In such a scenario, an environment may include any number of video cameras (and/or any other sensors) that may be configured to capture live video of an environment to be monitored. The system may capture the video content from the cameras that is being directly streamed to the cloud and/or connected to an edge device. The image frames may be extracted from the real-time video signals and loaded into an activity recognition artificial intelligence model, which may be a Long Short-Term Memory network. A Long Short-Term Memory network may be a type of recurrent neural network capable of learning order dependence in sequence prediction problems. The model may be trained on a dataset of videos that contain people engaged in various activities, such as, but not limited to, standing, walking, running, fighting, jumping, sliding, and/or other activities. If the model outputs a prediction that a user is interested in with a certain confidence then the edge system or the cloud system may transmit an alert to designated devices, to email addresses, and/or to the cloud.

In a third use-case scenario, the system 100 (and other subsystems) may be utilized to facilitate estimation of crown density. In such a scenario, an environment may include any number of video cameras (and/or any other sensors) that may be configured to capture live video of an environment to be monitored. The system may capture the video content from the cameras that is being directly streamed to the cloud and/or connected to an edge device. The image frames may be extracted from the real-time video signals and loaded into a crowd density estimation artificial intelligence model, which may be a Deep Convolutional Neural Network. The model may be trained on a dataset of images that may contain people. The model may output a prediction of the number of people in a given video or image frame, and the edge system and/or the cloud system may transmit an alert to a designated device, to email addresses, and/or to the cloud.

In a fourth use-case scenario, the system 100 (and other subsystems) may be utilized to facilitate person reidentification. In such a scenario, an environment may include any number of video cameras (and/or any other sensors) that may be configured to capture live video of an environment to be monitored. The system may capture the video content from the cameras that is being directly streamed to the cloud and/or connected to an edge device. The image frames may be extracted from the real-time video signals and loaded into a person reidentification artificial intelligence model, which may be a Deep Convolutional Neural Network. The model may detect when a person of interest reappears in another camera and the edge system and/or cloud system transmits an alert to a designed device, to email addresses, and/or to the cloud.

In a fifth use-case scenario, the system 100 (and other subsystems) may be utilized to facilitate vehicle speed detection. In such a scenario, an environment may include any number of video cameras (and/or any other sensors) that may be configured to capture live video of an environment to be monitored. The system may capture the video content from the cameras that is being directly streamed to the cloud and/or connected to an edge device. The image frames may be extracted from the real-time video signals and loaded into a vehicle speed detection artificial intelligence model, which may be a Deep Convolutional Neural Network. The model may detect the vehicles in the image(s) and may track them across several frames. Their location across the multiple frames may be utilized to calculate the distance traveled and the time elapsed between a starting point and an endpoint may be utilized to detect their speed. If their speed exceeds a certain amount that a user specifies, the edge system and/or the cloud system may generate and transmit an alert to a designed device, to email addresses, and/or to the cloud.

In still further scenarios, the system 100 (and other subsystems) may be utilized to conduct predictive modeling of events based on conditions fed into an artificial intelligence engine from previous events that may have been monitored by the system 100 (and other subsystems), third-party information, or a combination thereof. Additionally, the system 100 (and other subsystems) may conduct analyses of trending information from the machine learning and/or artificial intelligence of the system 100, which may be utilized for predictive modeling as well. Furthermore, the system 100 (and other subsystems) may conduct simulations of potential outcomes based on confidence-based variables that may be utilized to anticipate, prepare, and train.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, capturing first content generated by a sensor monitoring an environment; loading the captured first content into an artificial intelligence model(s) for analysis; comparing the first content to second content that is utilized to train the artificial intelligence model(s) and/or is otherwise associated with the artificial intelligence model(s); determining if the first content matches and/or has a correlation with the second content associated with the artificial intelligence model(s); generating a prediction relating to the detection of an object, an activity, a motion, an action, an occurrence, an anomaly, or a combination thereof, based on the correlation and/or match; generating a confidence score for the prediction; determining if the confidence score is at or above a threshold value; facilitating the output of a response if the confidence score is at or above the threshold value; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-10 illustrates specific example configurations of the various components of the system 100, the system 100 may include any configuration of the components, which may include using a greater or lesser number of the components. For example, the system 100 is illustratively shown as including a first user device 102, a second user device 111, a weapon 120, a camera 125, sensor 130, a communications network 135, a server 140, a server 145, a server 150, a server 160, an edge device 165, a local storage 167, an audio sensor 170, a processor 180, an alert receiver 185, a device hub 190, a gateway and service mesh 702, a scalable pool of computing power 708, and a database 155. However, the system 100 may include multiple first user devices 102, multiple second user devices 111, multiple weapons 120, multiple cameras, multiple sensors 130, multiple communications networks 135, multiple servers 140, multiple servers 145, multiple servers 150, multiple servers 160, multiple databases 155, multiple edge devices 165, multiple local storages 167, multiple audio sensors 170, multiple processors 180, multiple alert receivers 185, multiple device hubs 190, multiple gateway and services meshes 702, multiple pools of computing power 708, or any number of any of the other components inside or outside the system 100. Furthermore, in certain embodiments, substantial portions of the functionality and operations of the system 100 may be performed by other networks and systems that may be connected to system 100.

Figure 9:
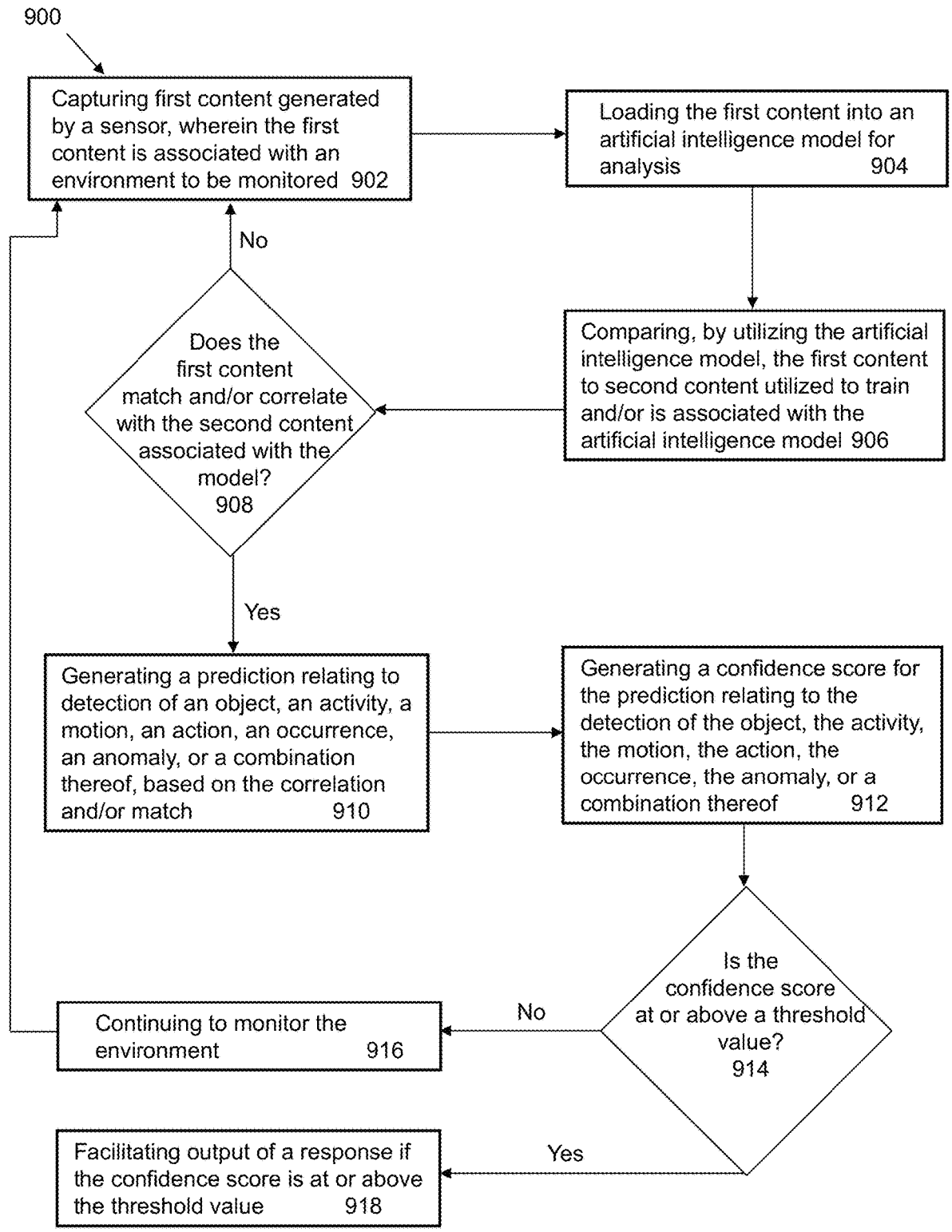
FIG. 9 is a flow diagram illustrating a sample method for providing security analytics from surveillance systems using artificial intelligence according to an embodiment of the present disclosure.

Notably, the system 100 may execute and/or conduct the functionality as described in the method(s) that follow. As shown in FIG. 9, an exemplary method 900 for providing security analytics from surveillance systems using artificial intelligence and other technologies is schematically illustrated. The method 900 and/or functionality and features supporting the method 900 may be conducted via an application of the system 100, devices of the system 100, processes of the system 100, any component of the system 100, or a combination thereof. The method 900 may include steps for capturing content and data generated by sensors, loading the content into artificial intelligence models for analysis, using the artificial intelligence models to compare the content to content utilized to train the artificial intelligence models, determining if the content correlates and/or matches with the content used to train the artificial intelligence models, generating predictions relating to the detection of an object, action, and/or occurrence, generating confidence scores for the predictions, and facilitating output of a response if the confidence score is at or above a threshold value. At step 902, the method 900 may include capturing first content generated by one or more sensors. The first content, for example, may be content associated with an environment to be monitored by the system 100. In certain embodiments, the environment may include, but is not limited to, an airport, an office building, a park, a train station, a body of water, a highway, a city, a state, a nation, a region of the sky, a mountain, a jungle, any type of environment, or a combination thereof. In certain embodiments, the system 100 may be utilized to monitor people, animals, vehicles, and/or other objects existing in the environment. The sensors may include, but are not limited to, cameras, pressure sensors, temperature sensors, acoustic sensors, humidity sensors, motion sensors, light sensors, chemical detection sensors, heart rate sensors, infrared sensors, thermal sensors, proximity sensors, radiation sensors, position sensors, GPS sensors, particle sensors, any type of sensors, or a combination thereof. In certain embodiments, the capturing of the first content from the one or more sensors may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device.

At step 904, the method 900 may include loading the first content into an artificial intelligence model(s) for analysis. In certain embodiments, artificial intelligence model may be a file, program, module, and/or process that may be trained by the system 100 (or other system described herein) to recognize certain patterns, behaviors, and/or content. For example, the artificial intelligence model(s) may be trained by the system 100 to detect specific types of objects, activity, occurrences, actions, motion, speed, and/or anything of interest. In certain embodiments, the artificial intelligence model may be, may include, and/or may utilize a Deep Convolutional Neural Network, a one-dimensional convolutional neural network, a two-dimensional convolutional neural network, a Long Short-Term Memory network, any type of machine learning system, any type of artificial intelligence system, or a combination thereof. In certain embodiments, the artificial intelligence model may incorporate the use of any type of artificial intelligence and/or machine learning algorithms to facilitate the operation of the artificial intelligence model(s). Notably, the system 100 may utilize any number of artificial intelligence models. The system 100 may train the artificial intelligence model(s) to reason and learn from data fed into the system 100 so that the model may generate and/or facilitate the generation of predictions about new data and information that is fed into the system 100 for analysis. As an example, the artificial intelligence model may be trained with second content, such as, but not limited to, images, video content, audio content, text content, augmented reality content, virtual reality content, information relating to patterns, information relating to behaviors, information relating to characteristics of objects, motions, activities, and/or occurrences, information relating to environments, sensor data, any type of data, or a combination thereof. The second content that is utilized to train the artificial intelligence model may be utilized by the artificial intelligence model to associate such content to objects, activities, motions, occurrences, anomalies, and/or other items of interest. For example, if the artificial intelligence model is trained with thousands of images that are known to include a shooter with a gun, the artificial intelligence model may learn that images and/or other content that are fed into the model at a future time also include a shooter with a gun based on the future images and/or content having a correlation with the characteristics with any number of the images used to train the model. As additional data and/or content is fed into the model(s) over time, the model's ability to recognize objects, activities, persons, and/or items of interest will improve and be more finely tuned. In certain embodiments, the loading of the first content into the artificial intelligence model for analysis may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device.

At step 906, the method 900 may include comparing, by utilizing the artificial intelligence model(s), the first content to the second content utilized to train the artificial intelligence model(s) and/or otherwise associated with the artificial intelligence model(s). In certain embodiments, the comparing may also include comparing the first content to deductions, reasoning, intelligence, correlations, outputs, analyses, and/or other information that the artificial intelligence model(s) learned based on the training conducted with the second content. In certain embodiments, the comparing may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device. At step 908, the method 900 may include determining if the first content matches and/or correlates with the second content associated with the artificial intelligence model(s) and/or deductions, reasoning, intelligence, correlations, outputs, analyses, and/or other information that the artificial intelligence model(s) learned based on the training conducted with the second content. In certain embodiments, the determining may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device.

If, at step 908, the determining indicates that the first content does not match and/or correlate with the second content and/or information gleaned from the second content by the artificial intelligence model(s), the method 900 may proceed back to step 902 and continue to capture content associated with the environment from the one or more sensors. If, however, the determining indicates that the first content does match and/or does correlate with the second content and/or information extracted from the second content by the artificial intelligence model(s), the method 900 may proceed to step 910. At step 910, the method may include generation a prediction relating to the detection of an object, an activity, a motion, an action, occurrence, an anomaly, or a combination thereof, based on the correlation and/or match. For example, if the captured content and/or sensor data correlates with information in the artificial intelligence model associated with a gunshot, the artificial intelligence model may generate a prediction that a gunshot has occurred in the environment. In certain embodiments, the generation of the prediction may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device.

At step 912, the method 900 may include generation a confidence score for the prediction relating to the detection of the object, the activity, the motion, the action, the occurrence, the anomaly, or a combination thereof. In certain embodiments, the confidence score may be expressed as a percentage, as a number from 1-100, using any type of scale, using terms (e.g. low, medium, high), any type of score, or a combination thereof. In certain embodiments, the generation of the confidence score may be based on the degree of correlation of the captured content and/or data with the information in the artificial intelligence model(s). In certain embodiments, the confidence score may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device. At step 914, the method 900 may include determining whether the confidence score is at or above a threshold value. For example, if the confidence score is 75 and the threshold value is 80, the confidence score may not be at the required threshold value. In certain embodiments, the determining may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device.

If, at step 914, the confidence score is not at the threshold value, the method 900 may proceed to step 916. At step 916, the method 900 may include continuing to monitor the environment and continuing to capture additional content and/or data until the threshold value is reached. If, however, at step 914, the confidence score is at or above the threshold value, the method 900 may proceed to step 916. At step 916, the method 900 may include facilitating output of a response based on the confidence score being at or above the threshold value. In certain embodiments, the facilitation of the output of the response may be performed and/or facilitated by utilizing the first user 101, the second user 110 and/or by utilizing the first user device 102, the second user device 111, the camera 125, the sensor 130, the server 140, the server 145, the server 150, the server 160, the edge processor 165, the audio sensor 170, the communications network 135, any component of the system 100 and/or subsystems 400-800, any combination thereof, or by utilizing any other appropriate program, network, system, or device. The response, for example, may be to output an alert providing an indication of the detected object, activity, motion, action, occurrence, and/or anomaly, alert a threat response team, alert a system to initiate defense maneuvers, initiate any type of counteraction response, or a combination thereof. Notably, the method 900 may further incorporate any of the features and functionality described for the system 100, the subsystems 400-800, any other method disclosed herein, or as otherwise described herein.

The systems and methods disclosed herein may include still further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by training the system 100 over time based on data and/or other information provided and/or generated in the system 100, a reduced amount of computer operations may need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100 and/or subsystems 400-800. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, devices in the system 100 may transmit signals indicating that only a specific quantity of computer processor resources (e.g. processor clock cycles, processor speed, etc.) may be devoted to training the artificial intelligence model(s), comparing content obtained from an environment to information contained in the artificial intelligence model(s), determining of captured content correlates with information and/or content utilized to train an artificial intelligence model(s), generating predictions relating to detection of objects, activities, motions, actions, occurrences, and/or anomalies, generating confidence scores, facilitating output of responses based on various conditions, and/or performing any other operation conducted by the system 100, or any combination thereof. For example, the signal may indicate a number of processor cycles of a processor may be utilized to update and/or train an artificial intelligence model, and/or specify a selected amount of processing power that may be dedicated to generating or any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 10:
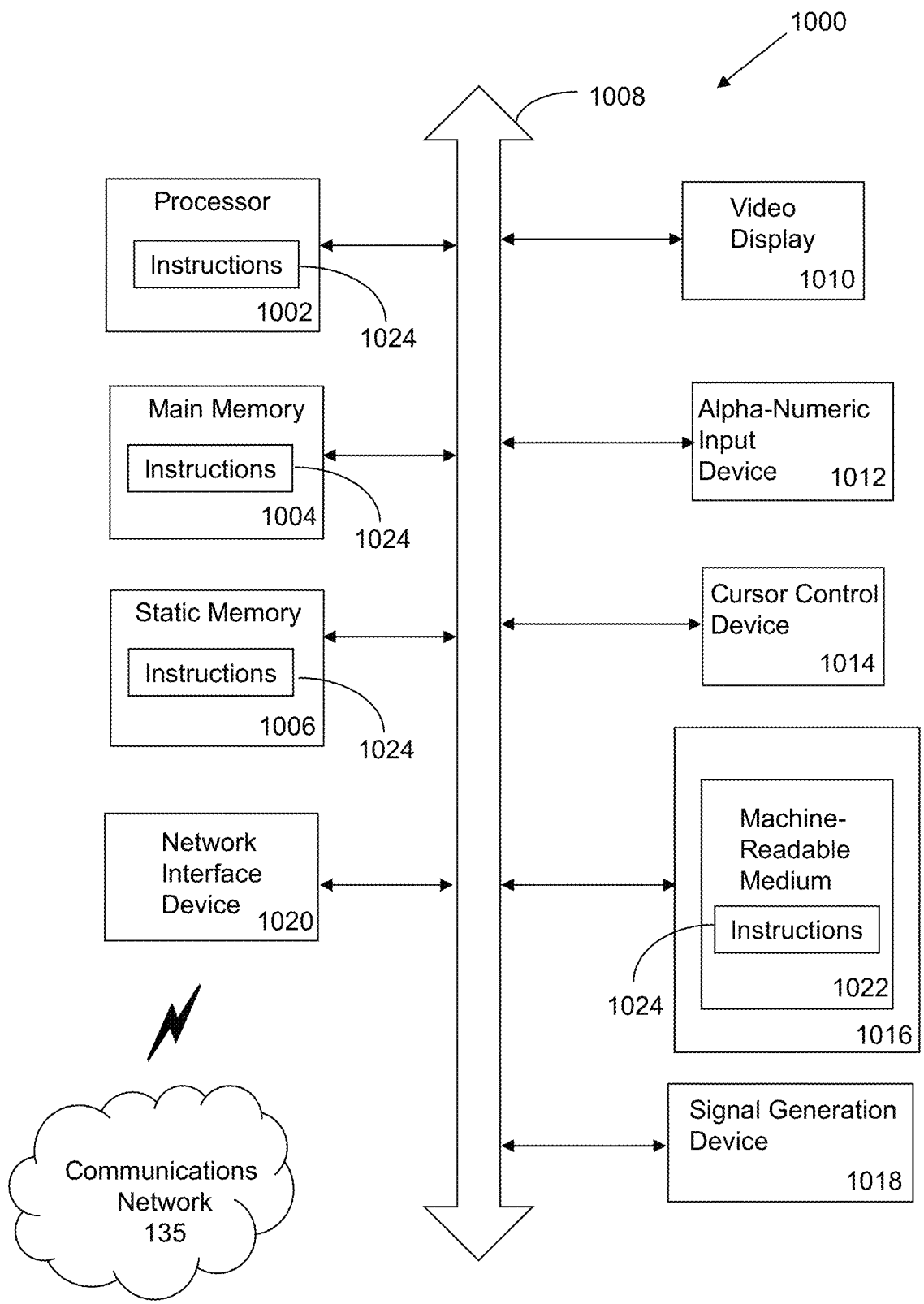
FIG. 10 is a schematic diagram of a machine in the form of a computer system within which a set of instructions, when executed, may cause the machine to provide security analytics from surveillance systems using artificial intelligence.

Referring now also to FIG. 10, at least a portion of the methodologies and techniques described with respect to the exemplary embodiments of the system 100 can incorporate a machine, such as, but not limited to, computer system 1000, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100. As another example, the computer system 1000 may assist with generating models associated with generating predictions relating to detection of an object, an activity, a motion, an action, an occurrence, an anomaly, anything, or a combination thereof, present in an environment being monitored by the system 100. As another example, the computer system 1000 may assist with outputting responses in response to detection of an object, an activity, a motion, an action, an occurrence, an anomaly, anything, or a combination thereof, in an environment being monitored by the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the camera 125, the sensor 130, the server 140, the server 145, the server 150, the database 155, the server 160, the edge device 165, the local storage 167, the audio sensor 170, the processor 180, the alert receiver 185, the device hub 190, the gateway and service mesh 702, the scalable pool of computing power 708, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010, which may be, but is not limited to, a liquid crystal display (LCD), a flat panel, a solid state display, or a cathode ray tube (CRT). The computer system 1000 may include an input device 1012, such as, but not limited to, a keyboard, a cursor control device 1014, such as, but not limited to, a mouse, a disk drive unit 1016, a signal generation device 1018, such as, but not limited to, a speaker or remote control, and a network interface device 1020.

The disk drive unit 1016 may include a machine-readable medium 1022 on which is stored one or more sets of instructions 1024, such as, but not limited to, software embodying any one or more of the methodologies or functions described herein, including those methods illustrated above. The instructions 1024 may also reside, completely or at least partially, within the main memory 1004, the static memory 1006, or within the processor 1002, or a combination thereof, during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1022 containing instructions 1024 so that a device connected to the communications network 135, another network, or a combination thereof, can send or receive voice, video or data, and communicate over the communications network 135, another network, or a combination thereof, using the instructions. The instructions 1024 may further be transmitted or received over the communications network 135, another network, or a combination thereof, via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
 a memory that stores instructions; and
 a processor that executes the instructions to perform operations, the operations comprising:
  capturing first content generated by a sensor, wherein the first content is associated with an environment to be monitored;
  loading the first content into an artificial intelligence model for analysis;
  comparing, by utilizing the artificial intelligence model, the first content to second content associated with the artificial intelligence model;
  generating, based on the first content correlating with the second content, a prediction relating to detection of an object, an activity, a motion, an action, an occurrence, or a combination thereof, wherein the prediction is generated based at least in part on comparing, by utilizing an algorithm of an audio signal processing system, a characteristic of audio content of the first content to a characteristic of an auditory signal known to be associated with the object, the activity, the motion, the action, the occurrence, or a combination thereof, to generate a first prediction relating to detection of the object, the activity, the motion, the action, the occurrence, or a combination thereof;

generating a confidence score for the prediction relating to the detection of the object, the activity, the motion, the action, the occurrence, or a combination thereof, and outputting an alert if the confidence score is at a threshold value.

2. The system of claim 1, wherein the operations further comprise transmitting the alert to a mobile device, a computing device, an email system, a cloud-computing system, or a combination thereof.

3. The system of claim 1, wherein the object, the activity, the motion, the occurrence, or a combination thereof, comprise a weapon, a gunshot, a crowd density, a person, a speed, a type of movement, speech, behavior, or a combination thereof.

4. The system of claim 1, wherein the first content comprises audio content, video content, image content, augmented reality content, virtual reality content, infrared content, content relating to temperature, content relating to pressure, content relating to humidity, content relating to motion, content relating to light, content relating to any type of sensor content, or a combination thereof.

5. The system of claim 1, wherein the sensor comprises a digital camera, an infrared camera, a temperature sensor, a pressure sensor, a humidity sensor, a motion sensor, a light sensor, an audio sensor, any type of sensor, or a combination thereof.

6. The system of claim 1, wherein the operation of capturing the first content comprises capturing a signal including video content generated by the sensor, and wherein the operations further comprise extracting a plurality of image frames from the signal and loading the image frames into the artificial intelligence model for the analysis.

7. The system of claim 1, wherein the operations further comprise training the artificial intelligence model using the first content to facilitate operation of the artificial intelligence model with a future detection.

8. The system of claim 1, wherein the operation of the capturing the first content comprises capturing the audio content occurring in the environment.

9. The system of claim 8, wherein the operations further comprise distributing the audio content to the audio signal processing system, a one-dimensional convolutional neural network, a two-dimensional convolutional neural network, or a combination thereof.

10. The system of claim 1, wherein the operations further comprise facilitating output of a response is the confidence score is at or above the threshold value.

11. The system of claim 1, wherein the operations further comprise analyzing, by utilizing the one-dimensional convolutional neural network, an audio channel, a sample rate, a bit-depth, an amplitude, a Mel-Frequency Cepstral Coefficient, a frequency, a temporal characteristic, or a combination thereof, associated with the audio content to generate a second prediction relating to detection of the object, the activity, the motion, the action, the occurrence, or a combination thereof.

12. The system of claim 11, wherein the operations further comprise converting, by utilizing the two-dimensional convolutional neural network, the audio content into a plurality of spectrograms, and wherein the operations further comprise comparing the plurality of spectrograms to a set of spectrograms utilized to train the artificial intelligence program, and wherein the operations further comprise utilizing the comparing to generate a third prediction relating to detection of the object, the activity, the motion, the action, the occurrence, or a combination thereof.

13. The system of claim 12, wherein the operations further comprise generating a verdict relating to the prediction based on confidence scores and weights associated with the first prediction, the second prediction, the third prediction, or a combination thereof.

14. A method, comprising:
capturing first content generated by a sensor, wherein the first content is associated with an environment to be monitored;
loading the first content into an artificial intelligence model for analysis;
comparing, by utilizing the artificial intelligence model and by utilizing instructions form a memory that are executed by a processor, the first content to second content associated with the artificial intelligence model;
generating, based on the first content correlating with the second content, a prediction relating to detection of an object, an activity, a motion, an action, an occurrence, or a combination thereof, wherein the prediction is generated based at least in part on comparing, by utilizing an algorithm of an audio signal processing system, a characteristic of audio content of the first content to a characteristic of an auditory signal known to be associated with the object, the activity, the motion, the action, the occurrence, or a combination thereof, to generate a first prediction relating to detection of the object, the activity, the motion, the action, the occurrence, or a combination thereof;
providing a confidence score for the prediction relating to the detection of the object, the activity, the motion, the action, the occurrence, or a combination thereof; and
generating an alert if the confidence score is at a threshold value.

15. The method of claim 14, further comprising conducting pre-processing on the first content to remove noise from the first content.

16. The method of claim 14, further comprising adjusting the threshold value for generating the alert.

17. The method of claim 14, further comprising facilitating initiation of a response in response to the alert.

18. The method of claim 14, further comprising training the artificial intelligence model with additional content as the additional content is captured by the sensor over time.

19. The method of claim 14, further comprising generating the confidence score for the prediction based on a strength of the correlation of the first content with the second content.

20. A non-transitory computer-readable device comprising instructions, which, when loaded and executed by a processor, cause the processor to perform operations, the operations comprising:
capturing first content generated by a sensor, wherein the first content is associated with an environment to be monitored;
loading the first content into an artificial intelligence model for analysis;
comparing, by utilizing the artificial intelligence model, the first content to second content associated with the artificial intelligence model;
determining, based on the first content correlating with the second content, a prediction relating to detection of an object, an activity, a motion, an action, an occurrence, or a combination thereof, wherein the prediction is determined based at least in part on comparing, by utilizing an algorithm of an audio signal processing system, a characteristic of audio content of the first content to a characteristic of an auditory signal known to be associated with the object, the activity, the motion, the action, the occurrence, or a combination thereof, to generate a first prediction relating to detection of the object the activity, the motion the action the occurrence, or a combination thereof;

determining a confidence score for the prediction relating to the detection of the object, the activity, the motion, the action, the occurrence, or a combination thereof; and outputting an alert if the confidence score is at a threshold value.

* * * * *